United States Patent
Barr et al.

(10) Patent No.: US 8,650,963 B2
(45) Date of Patent: Feb. 18, 2014

(54) ELECTROSTATICALLY COUPLED PRESSURE SENSOR

(75) Inventors: Frederick James Barr, Pearland, TX (US); Stig Rune Lennart Tenghamn, Katy, TX (US); Anders Göran Mattsson, Lysaker (NO)

(73) Assignee: PGS Geophysical AS, Lysaker (NO)

( * ) Notice: Subject to any disclaimer, the term of this patent is extended or adjusted under 35 U.S.C. 154(b) by 186 days.

(21) Appl. No.: 13/209,940

(22) Filed: Aug. 15, 2011

(65) Prior Publication Data

US 2013/0042695 A1   Feb. 21, 2013

(51) Int. Cl.
 *G01L 7/08*   (2006.01)
 *G01N 1/10*   (2006.01)

(52) U.S. Cl.
 USPC .......................................... 73/715; 73/170.29

(58) Field of Classification Search
 None
 See application file for complete search history.

(56) References Cited

U.S. PATENT DOCUMENTS

| | | |
|---|---|---|
| 3,397,358 A | 8/1968 | Allenden |
| 3,832,762 A | 9/1974 | Johnston |
| 4,864,463 A | 9/1989 | Shkedi et al. |
| 5,070,483 A | 12/1991 | Berni |
| 5,109,362 A | 4/1992 | Berni |
| 5,134,882 A | 8/1992 | Taylor |
| 5,170,566 A | 12/1992 | Fowler et al. |
| 5,327,216 A | 7/1994 | Berni |
| 5,440,939 A | 8/1995 | Barny et al. |
| 5,723,790 A | 3/1998 | Andersson |
| 5,894,316 A * | 4/1999 | Sakai et al. ............... 347/54 |
| 5,903,349 A | 5/1999 | Vohra et al. |
| 5,955,884 A | 9/1999 | Payton et al. |
| 6,109,113 A * | 8/2000 | Chavan et al. ............... 73/718 |
| 6,684,160 B1 | 1/2004 | Ozbek et al. |
| 6,788,618 B2 | 9/2004 | Clayton et al. |
| 6,842,006 B2 | 1/2005 | Conti et al. |
| 6,873,571 B2 | 3/2005 | Clayton et al. |
| 6,901,028 B2 | 5/2005 | Clayton et al. |
| 6,921,894 B2 | 7/2005 | Swierkowski |
| 7,116,036 B2 | 10/2006 | Balasubramaniam et al. |
| 7,298,672 B1 | 11/2007 | Tenghamn |
| 7,331,803 B2 | 2/2008 | Steigerwald |
| 7,642,784 B2 | 1/2010 | Reddig et al. |

(Continued)

FOREIGN PATENT DOCUMENTS

| | | |
|---|---|---|
| EP | 0 210 843 A2 | 7/1986 |
| GB | 2402745 | 12/2004 |

(Continued)

OTHER PUBLICATIONS

PGS, "OptoSeis Reservoir Imaging", (Online) (Retrieved on May 5, 2010) Retrieved from the internet URL <http://www.pgs.com/upload/208514/PGS%20OptoSeis.pdf>, 6 pgs.

(Continued)

*Primary Examiner* — Andre Allen (57) ABSTRACT

A disclosed pressure-responsive sensor includes a flexible element contained within an enclosure and a membrane configured to exert an electrostatic force on the flexible element to cause the flexible element to respond to pressure variations on the membrane. A disclosed pressure-sensing method includes electrostatically coupling a membrane to a flexible element contained within an enclosure to transfer a pressure response of the membrane to the flexible element. Motion of the flexible element is converted into a pressure signal.

20 Claims, 7 Drawing Sheets

(56) References Cited

U.S. PATENT DOCUMENTS

| | | | |
|---|---|---|---|
| 7,667,375 | B2 | 2/2010 | Berkcan |
| 7,671,598 | B2 | 3/2010 | Ronaess et al. |
| 2005/0194201 | A1 | 9/2005 | Tenghamn et al. |
| 2007/0230721 | A1 | 10/2007 | White |
| 2008/0253225 | A1 | 10/2008 | Welker et al. |
| 2009/0235752 | A1* | 9/2009 | Miyashita ..................... 73/718 |

FOREIGN PATENT DOCUMENTS

| | | |
|---|---|---|
| JP | 7335909 A | 12/1995 |
| WO | WO-2004/053528 A1 | 6/2004 |
| WO | WO 2007/029133 A2 | 3/2007 |
| WO | WO 2010/054216 A2 | 5/2010 |

OTHER PUBLICATIONS

Seth, Samir N., "Reservoir Optimization: Permanent Seismic Monitoring Using Fiber Optics", *PGS Optomism*, (May 19, 2009), 29 pgs.

Seeger, Joseph I., et al., "Sense Finger Dynamics in a ΣΔ Force-Feedback Gyroscope", *Technical Digest of the Solid-State Sensor and Actuator Workshop*, (Jun. 2000), pp. 296-299, Hilton Head Island, SC.

Chandrakasan, Anantha et al., "Trends in Low Power Digital Signal Processing", *Proceedings of IEEE International Symposium on Circuits and Systems*, (1998), pp. 604-607, vol. 4, Monterey, CA (USA).

Mitcheson, P.D. et al., "MEMS Electrostatic Micropower Generator for Low Frequency Operation", *Sensors and Actuators A*, (2004), pp. 523-529, vol. 115.

Ergen, Sinem C., "Zigbee/IEEE 802.15.4 Summary", *Advanced Technology Lab of National Semiconductor*, (Sep. 4, 2004), 37 pgs.

Lewis, Christopher P., et al., "Simulation of Micromachined Digital Accelerometer in SIMULINK and PSPICE", *UKACC International Conference on Control*, (Sep. 1996), pp. 205-209, vol. 1, Conf. Publ. No. 427.

Lee, Haksue et al., "A Micro-Machined Piezoelectric Flexural-Mode Hydrophone with Air Backing: Benefit of Air Backing for Enhancing Sensitivity", *J. Acoustical Society of America*, (Sep. 2010), pp. 1033-1044, vol. 128, No. 3.

Choi, Sungjoon et al., "A Micro-Machined Piezoelectric Flexural-Mode Hydrophone with Air Backing: A Hydrostatic Pressure-Balancing Mechanism for Integrity Preservation", *J. Acoustical Society of America*, (Sep. 2010), pp. 1021-1032, vol. 128, No. 3.

Rickert, William T., et al., "Systems and Methods for Wireless Communication in a Geophysical Survey Streamer", U.S. Appl. No. 13/073,832, filed Mar. 28, 2011.

Tenghamn, Stig Rune L., "Systems and Methods for Energy Harvesting in a Geophysical Survey Streamer", U.S. Appl. No. 13/073,823, filed Mar. 28, 2011.

Tenghamn, Stig Rune L., et al., "Digital Sensor Streamers and Applications Thereof", U.S. Appl. No. 13/206,002, filed Aug. 9, 2011.

Barr, Frederick J., et al., "Piezoelectric Sensors for Geophysical Streamers", U.S. Appl. No. 13/209,909, filed Aug. 15, 2011.

United Kingdom Search Report, mailing date: Sep. 14, 2012.

\* cited by examiner

ELECTROSTATICALLY COUPLED PRESSURE SENSOR

BACKGROUND

In the field of geophysical prospecting, the knowledge of the earth's subsurface structure is useful for finding and extracting valuable mineral resources such as oil and natural gas. A well-known tool of geophysical prospecting is a "seismic survey." In a seismic survey, acoustic waves produced by one or more sources are transmitted into the earth as an acoustic signal. When the acoustic signal encounters an interface between two subsurface strata having different acoustic impedances, a portion of the acoustic signal is reflected back to the earth's surface. Sensors detect these reflected portions of the acoustic signal, and the sensors' outputs are recorded as data. Seismic data processing techniques are then applied to the collected data to estimate the subsurface structure. Such surveys can be performed on land or in water.

In a typical marine seismic survey, multiple streamer cables and one or more seismic sources are towed behind a vessel. A typical streamer includes multiple seismic sensors positioned at spaced intervals along its length. The seismic sensors often include pressure sensors ("hydrophones") and accelerometers. The use of different sensor types enables better rejection of noise and directional filtering of seismic waves.

Suitable accelerometer types for use in marine seismic streamers include micro electromechanical systems ("MEMS") accelerometers. Such accelerometers generally employ a semiconductor substrate with an etched or deposited mechanical element that moves or deforms in response to the sensor's acceleration. Circuitry on the substrate measures the degree of movement or deformation to generate a sensor output signal. Feedback can be employed to ensure that the sensor makes accurate measurements.

BRIEF DESCRIPTION OF THE DRAWINGS

A better understanding of the various disclosed embodiments can be obtained when the detailed description is considered in conjunction with the attached drawings, in which.

It should be understood that the drawings and detailed description do not limit the disclosure, but on the contrary, they provide the foundation for understanding all modifications, equivalents, and alternatives falling within the scope of the appended claims.

DETAILED DESCRIPTION

Though many commercial hydrophone embodiments exist, they lack the advantages of a MEMS device. At least one effort to provide a MEMS hydrophone is documented in U.S. Pat. App. Pub. 2007/0230721 "Trapped fluid microsystems for acoustic sensing", filed Jan. 23, 2007 by White and Grosh. As such devices are miniaturized, it becomes possible to make their sensing elements increasingly sensitive. However, because the sensing elements are in a confined, fluid-filled space, the molecular motion of that fluid becomes an increasingly significant contributor to measurement noise. To combat this source of noise while still making it possible to measure pressure, there is proposed herein a pressure sensor in which the sensing element is enclosed within a vacuum or low-pressure space. The sensing element is electrostatically coupled to a membrane that moves or deforms in response to an ambient or applied pressure. The electrostatic coupling may be provided by similarly charged electrodes on the sensing element and the membrane. These electrodes may be separated by a small gap or capacitively coupled via a pair of intermediate electrodes. These configurations may preserve the sensitivity of the sensing element while shielding it from molecular-motion induced noise.

Figure 1:
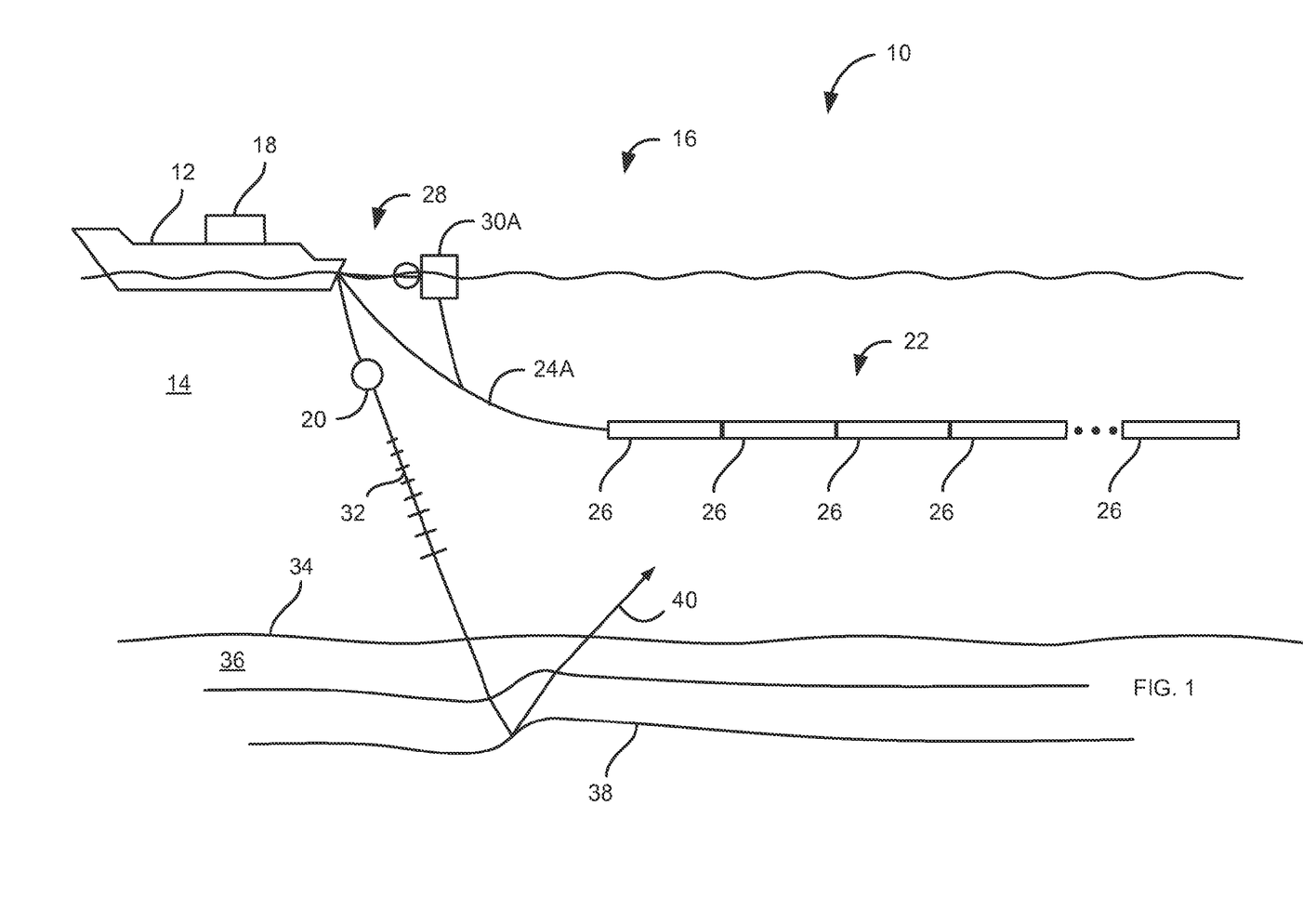
FIG. 1 shows an illustrative marine geophysical survey system performing a seismic survey.

The principles and operation of the disclosed embodiments are best understood in a suitable usage context. Accordingly, FIG. 1 shows an illustrative marine geophysical survey system 10 performing a marine seismic survey. A survey vessel or ship 12 moves along the surface of a body of water 14, such as a lake or an ocean, transporting a data acquisition system 16 that includes a data recording 18 aboard the ship 12. The data acquisition system 16 also includes a seismic source 20 and a sensor array 22 towed through the water 14 by the ship 12. The sensor array 22 includes one or more streamers 24A, each streamer including multiple sections 26 connected end to end. Each of the streamer sections includes spaced apart sensor units. Each sensor unit includes one or more sensors that detect seismic signals and produce output signals indicative of the seismic signals. Position sensors are typically included to track the motion and configuration of the sensor array. A data recording system 18 collects and stores data from the sensor units.

The streamers 24A are towed via a harness 28 that produces a desired arrangement of the streamers 24. The harness 28 includes multiple interconnected cables and paravanes 30A to control the positioning of the streamers. Electrical conductors and/or fiber optic cables connect the sensor units in the streamer sections 26 of the streamers 24 to the data recording system 18 aboard the ship 12.

A seismic source 20 produces acoustic waves 32 under the control of the data recording system 18. The seismic source 20 may be or include, for example, an air gun, a vibrator, or other device. The acoustic waves 32 travel through the water 14 and into a subsurface 36 below a bottom surface 34. When the acoustic waves 32 encounter changes in acoustic impedance (e.g., at boundaries or layers between strata), portions of the acoustic waves 32 are reflected. The portions of the acoustic waves 32 reflected from subsurface layers are called "seismic reflections". In FIG. 1, one such seismic reflection is shown from an interface 38 and labeled "40". As described in more detail below, sensor units of the sensor array 22, housed in the streamer sections 26 of the streamers 24, detect these seismic reflections and produce output signals indicative of the seismic reflections. The output signals produced by the sensor units are recorded by the data recording system 18 aboard the ship 12. The recorded signals are later interpreted to infer structure of, fluid content of, and/or composition of rock formations in the subsurface 36.

Figure 2:
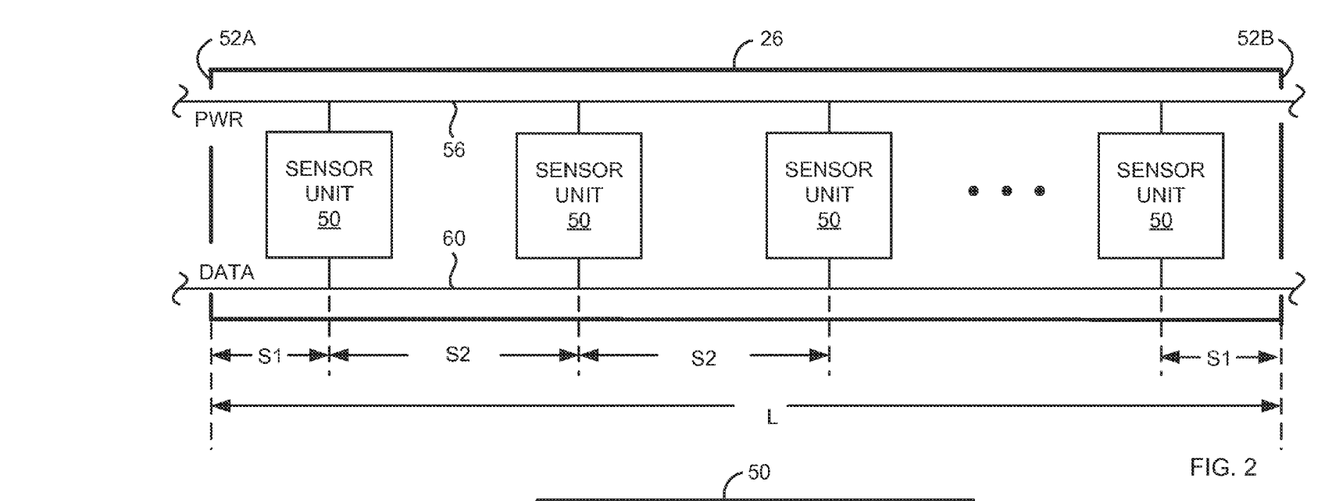
FIG. 2 shows an illustrative marine streamer section.

FIG. 2 shows an illustrative embodiment of one of the streamer sections 26. The illustrated streamer section 26 includes multiple spaced apart sensor units 50, where each of the sensor units 50 includes at least one seismic sensor as described in more detail below. The streamer section 26 may be substantially cylindrical, and has two opposed ends 52A and 52B. The streamer section 26 has a length L, where L is expected to be between about 164 feet (50 meters) and 328 feet (100 meters), with sensor unit spacings of S1 from the ends 52A, 52B, and spacings of S2 from each other, where S1 and S2 are each expected to be less than 4.9 feet (1.5 meters). In some embodiments S2 may lie in the range between 4 inches (10 cm) and 40 inches (100 cm), or in the narrower range between 7 inches (18 cm) and 14 inches (36 cm). Each of the ends 52A and 52B has one or more connectors for electrical power and data signals.

In at least some streamer embodiments, the sensor units 50 are partitioned into groups of N sensor units, where N is preferably between about 4 and approximately 64. When grouped, the sensor units 50 in each group are connected to a common group control unit. Each group control unit may receive data signals from the corresponding sensor units 50 and produce a single output data stream that conveys the data from the group. The output data stream may be produced using, for example, data compression techniques, time division multiplexing techniques, and/or frequency division multiplexing techniques.

FIG. 2 shows a power distribution bus 56 and a data bus 60 that span the length of the streamer section 26 between the connectors at the ends 52A and 52B. Each of the sensor units 50 within the streamer section 26 is coupled to the power distribution bus 56 and the data bus 60. The power distribution bus 56 includes electrical conductors for providing electrical power to the sensor units 50. The data bus 60 includes electrical conductors and/or fiber optic cables for conveying output data streams produced by the sensor units 50. The data bus 60 is also used to convey output data streams produced by other sensor units within other streamer sections connected to the end 52B. A jacket covers the streamer section's exterior, and the streamer section may further include one or more strength members extending along its length of the streamer sections inside the jacket. Suitable streamer section construction techniques are described in U.S. Pat. No. 7,298,672 granted to Tenghamn et al., incorporated herein by reference in its entirety. Other streamer design and construction techniques are also known and can be used.

Figure 3:
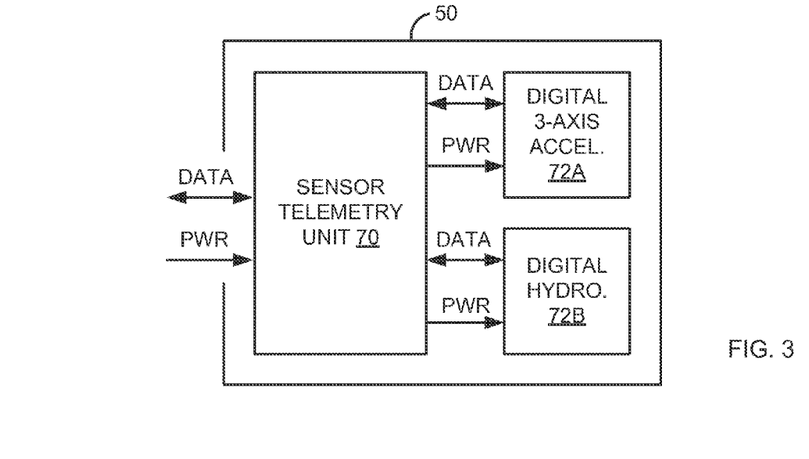
FIG. 3 shows an illustrative marine seismic sensor unit.

FIG. 3 shows an illustrative embodiment of sensor unit 50. The illustrated sensor unit 50 includes a sensor telemetry unit 70 coupled to a 3-axis accelerometer 72A and a hydrophone 72B. The sensor telemetry unit 70 is coupled to the power distribution bus 56 and to the data bus 60 of FIG. 2, and provides electrical power to the sensors. The sensor telemetry unit 70 receives output signals from the sensors and generates an output data stream that includes representations of the sensor output signals for transmission to the data recording system 18 (see FIGS. 1-2) via the data bus 60. The sensor telemetry unit may further receive commands from the data recording system 18 via the data bus 60 and may adjust the operation of itself and the sensors accordingly.

Electrical power requirements and streamer weight often limit a number of sensors that can be located in streamer sections, so it is desirable to employ light sensors with low power requirements. Embodiments of an illustrative sensor unit 50 including one or more digital sensors are described below. At least some embodiments also employ MEMS technology to further reduce weight and power requirements. MEMS devices include micromachined components with miniature moving mechanical structures. Micromachining creates precisely patterned structures on relatively thick substrates through either bulk or surface processing technologies. Bulk micromachining sculpts moving pieces by removing material from the substrates. Surface micromachining involves depositing and subsequently etching thin films on the substrates, akin to common integrated circuit manufacturing processes. Both technologies can produce physically smaller sensors that typically weigh less and dissipate less electrical energy. As explained further below, integrated digitization circuitry further reduces energy consumption as compared to an analog sensor followed by a separate analog-to-digital converter. The usage of such digital sensors in a streamer may make it possible to have an increased number of sensors while maintaining or reducing overall power and wiring requirements for the streamer.

Figure 4A:
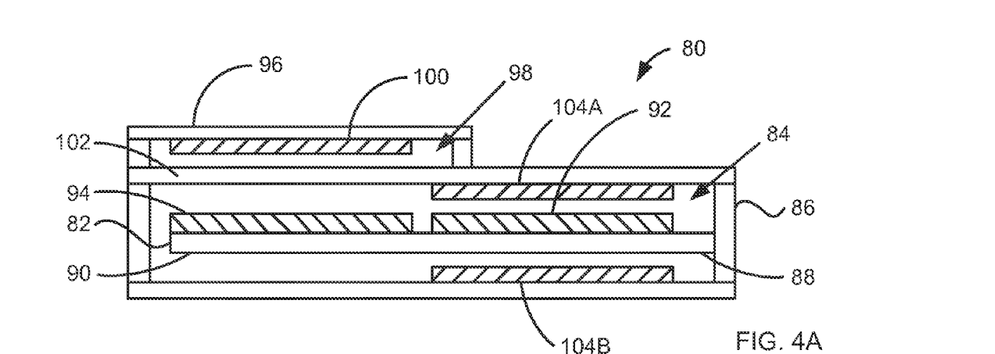
FIG. 4A shows an illustrative micro electromechanical system ("MEMS") pressure sensor.
Figure 4B:
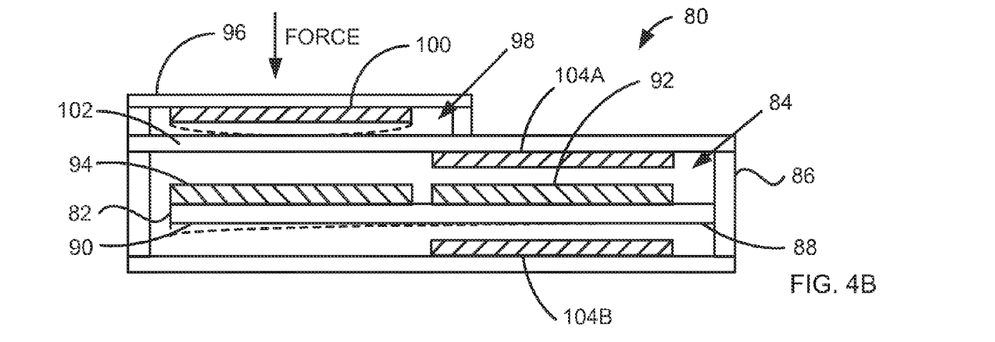
FIG. 4B shows the illustrative sensor's response to pressure.

FIGS. 4A-4B show an illustrative MEMS pressure sensor 80. Pressure sensor 80 includes a cantilever member 82 suspended within a first chamber 84 of a substantially rigid housing 86. The cantilever member 82 is substantially rectangular, and has two opposed and substantially planar major surfaces. A base end 88 of the cantilever member 82 is attached to the housing 86, and an opposite free end 90 is free to move within the first chamber 84. A first electrode 92 is formed on an outer surface of the cantilever member 82 near the base end 88, and a second electrode 94 is formed on an outer surface of the cantilever member 82 near the free end 90.

Pressure sensor 80 also includes a flexible membrane 96 having an electrode or conductive layer 100. The flexible membrane 96 is substantially planar, and is oriented parallel to one of the major surfaces of the cantilever member 82. The conductive layer 100 is positioned near the second electrode 94 to facilitate electrostatic coupling between the two. The flexible membrane 96 forms a wall of a second chamber 98 within the housing 86, and it is configured to deform in response to an input stimulus (e.g., pressure or a mechanical force). The flexible membrane 96 has a thickness that gives it sufficient strength to withstand expected hydrostatic pressures, yet deform sufficiently in an acoustic pressure field to generate adequate electrical forces on the cantilever member 82.

The two chambers are sealed; chamber 84 with a vacuum or low pressure to avoid causing or affecting the cantilever's movement, and chamber 98 with a pressure that provides an appropriate balance for external pressure conditions. Note that the figures are not drawn to scale and that chamber 98 may in practice be larger than chamber 84. Depending on the design conditions, chamber 98 may be filled with an inert gas or even kept at a vacuum. In the embodiment of FIG. 4, a non-conductive wall 102 separates the first chamber 84 and the second chamber 98. A first gap 103 exists between the flexible membrane 96 and the wall 102, allowing the flexible membrane 96 to move without contacting the wall 102. A second gap 105 exists between the cantilever member 82 and the wall 102, allowing the cantilever member 82 to move without contacting the wall 102.

Before operation, electrodes 94 and 100 are charged so as to exert a repulsive electrostatic force on each other, enabling motion of the membrane 96 to be communicated to the cantilever member 82. The cantilever member 82 has an inherent resilience that, absent any external forces, causes it to return to a neutral position. As the flexible membrane 96 moves toward the free end 90 of the cantilever member 82, the repulsive electrostatic force between the electrodes would increase, tending to cause the free end 90 of the cantilever member 82 to move away from the approaching flexible membrane 96 (i.e., to move in the same direction as the flexible membrane 96). Similarly, as the membrane 96 moves away from the cantilever, the repulsive force would decrease, enabling the inherent resilience of the cantilever member to cause the free end 90 of the cantilever member 82 to move towards the receding membrane.

Figure 5:
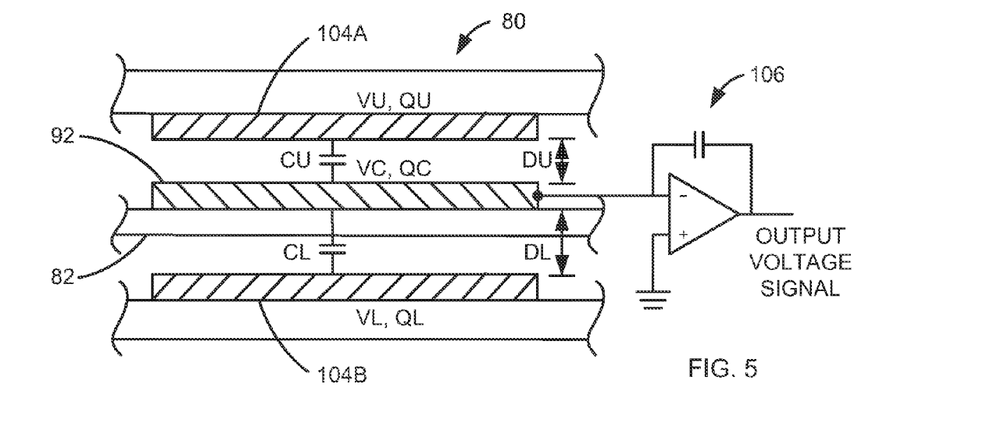
FIG. 5 shows an illustrative circuit for measuring the sensor's response.

As indicated in FIG. 5, pressure sensor 80 further includes a pair of conductive sense/control electrodes 104A and 104B positioned on opposite sides of the first electrode 92 that is on the base end 88 of the cantilever member 82. Assuming the presence of electrical charges 'QU', 'QC', and 'QL' on electrode 104A, electrode 92, and electrode 104B, respectively, the electrodes have corresponding voltages 'VU', 'VC', and 'VL' based on the areas of the electrodes and the distances 'DU' and 'DL' between the electrodes. Electrode 104A and electrode 92 essentially form a parallel plate capacitor having a capacitance 'CU' that varies inversely with distance 'DU', while electrode 92 and electrode 104B form a capacitor having a capacitance 'CL' that varies inversely with distance 'DL'. Motion of the electrode 92 causes changes to the capacitance CU and CL, which cause voltage VC to change relative to VU and VL. One or more charge amplifiers 106 are coupled to detect the relative voltage change(s) and produce a signal indicative of the capacitance change(s).

Figure 6:
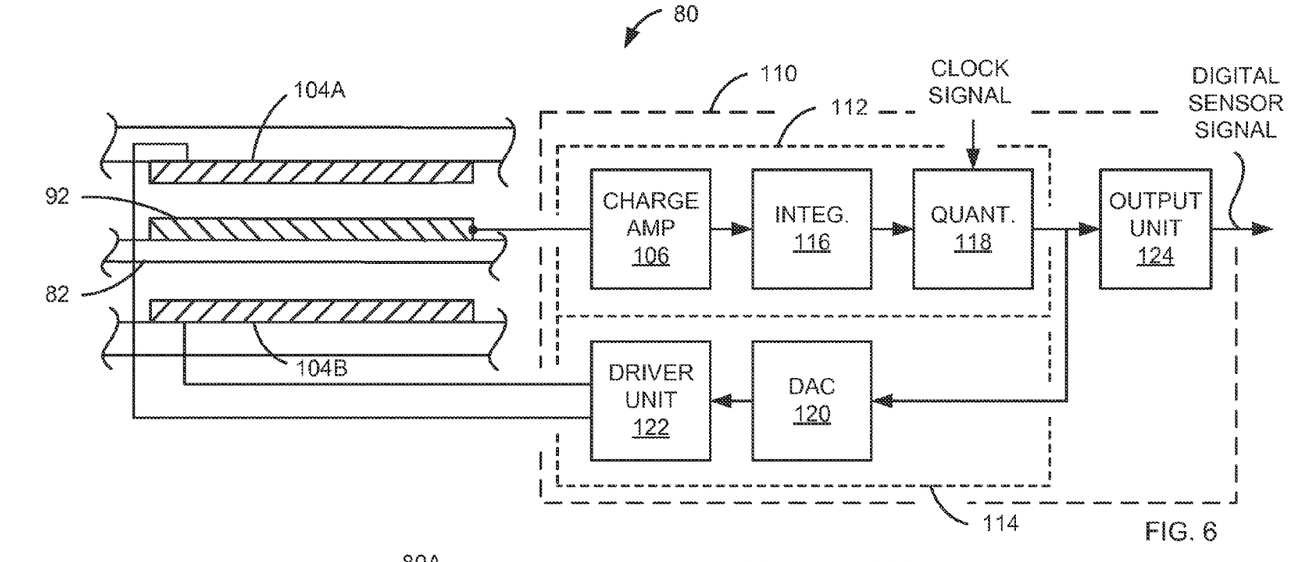
FIG. 6 shows an illustrative digital sensor circuit.

FIG. 6 shows an illustrative digital transducer circuit 110 that configures the pressure sensor mechanism as a digital sensor. The digital transducer circuit 110 includes forward circuitry 112, a quantized feedback loop 114, and an output unit 124. The forward circuitry includes charge amplifier 106 (FIG. 5), an integrator unit 116, and a quantizer unit 118. The quantized feedback loop provides a path to feed the output of quantizer unit 118 back to the sense/control electrode, and it may include a driver unit 122 to amplify the digital signal and/or provide a voltage shift. The output of quantizer unit 118 takes the form of a pulse density modulated signal that causes the cantilever to oscillate about an equilibrium position. If the equilibrium position is at the sensor's "null" position, the pulse density modulated signal has an equal number of 0's and 1's. The integrated response of the charge amplifier produces a sawtooth signal which the quantizer turns into alternating ones and zeros.

When an external stimulus tends to cause the equilibrium position of the cantilever to vary from the null position, the quantizer produces relatively more ones or zeros based on what is required to maintain the equilibrium position at the null point. The digital transducer circuit may include an output unit 124 that converts the pulse density modulated signal to a digital sensor reading. In at least some embodiments, the output unit 124 is a counter that measures the number of pulses in each given time interval. So long as the clock for the quantizer and output unit are substantially higher (e.g., >10 times) the highest frequency component of the measurand, the digital transducer circuit produces an accurate measurement.

Figure 7A:
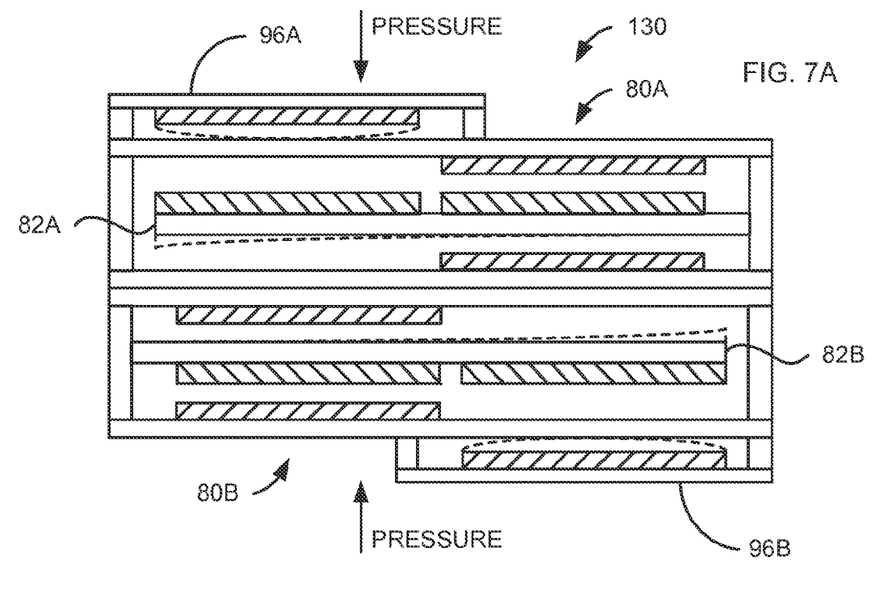
FIGS. 7A-7B illustrate a dual sensor's response to pressure and acceleration.
Figure 7B:
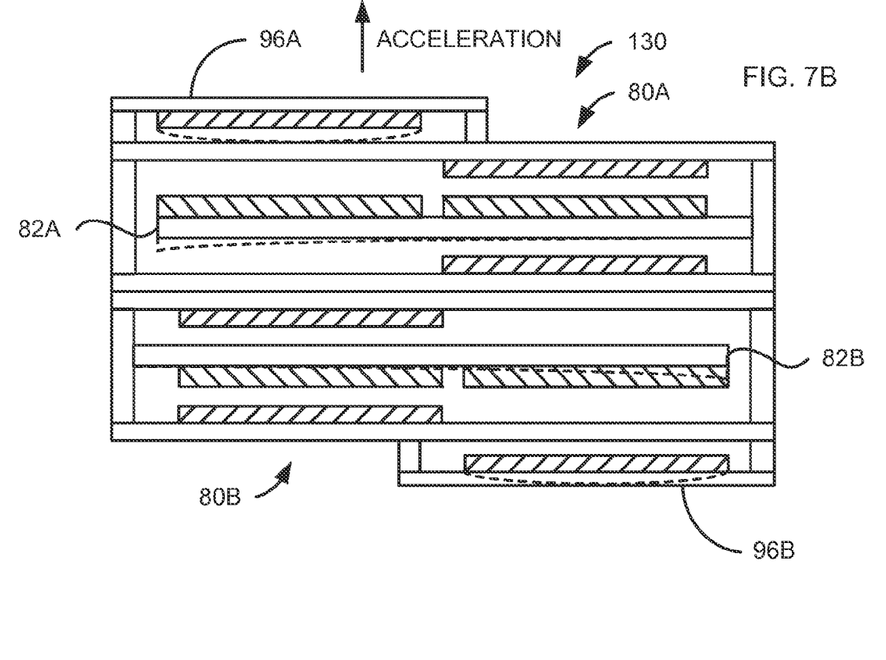

FIGS. 7A-7B illustrate the use of a pair of pressure sensors 80A, 80B in a back-to-back configuration. FIG. 7A illustrates the response of cantilevers 82A and 82B to a pressure stimulus, i.e., the expected movements of the flexible membranes 96A, 96B and cantilevers 82A, 82B are shown in broken outline. The indicated movements cause the sensors 80A and 80B to produce signals having the same signs or polarity. Similarly, FIG. 7B illustrates the response of the cantilevers to an acceleration stimulus. The indicated movements cause the sensors 80A and 80B to produce signals having opposite signs or polarity. Because the digital electrostatic sensors 80A and 80B are carefully matched, the signals can be added or subtracted to compensate for pressure (when acceleration measurements are desired) or acceleration (when pressure measurements are desired).

Figure 8:
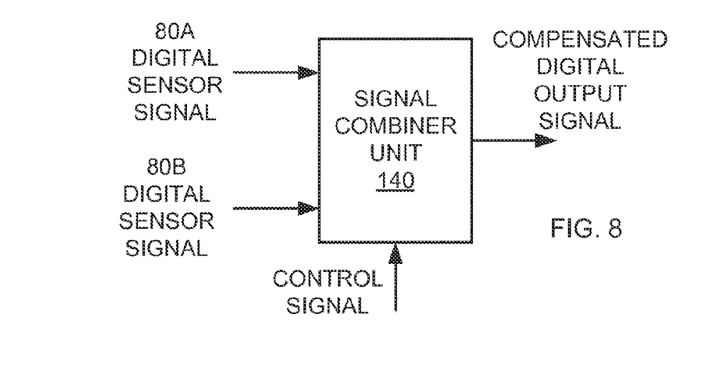
FIG. 8 shows an illustrative combiner unit for forming a compensated sensor response.

FIG. 8 shows an illustrative signal combiner unit 140 for combining the outputs of pressure sensors 80A and 80B to produce an acceleration-compensated pressure measurement. Where pressure sensors 80A, 80B include digital transducer circuitry, their outputs are digital values which are added by signal combiner unit 140 to provide a digital compensated sensor value. Control signals may be provided from sensor telemetry unit 70 to control the timing of the signal combiner unit's operation with respect to the operation of output unit 124. For analog sensor outputs, a set of amplifiers or even an impedance network can be used to add the sensor output signals.

Figure 9A:
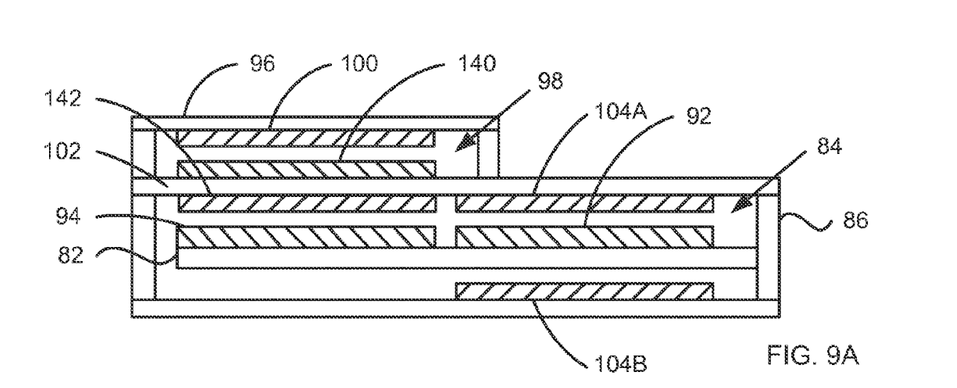
FIGS. 9A-9B show alternative embodiments of an illustrative MEMS pressure sensor with a rigid housing.
Figure 9B:
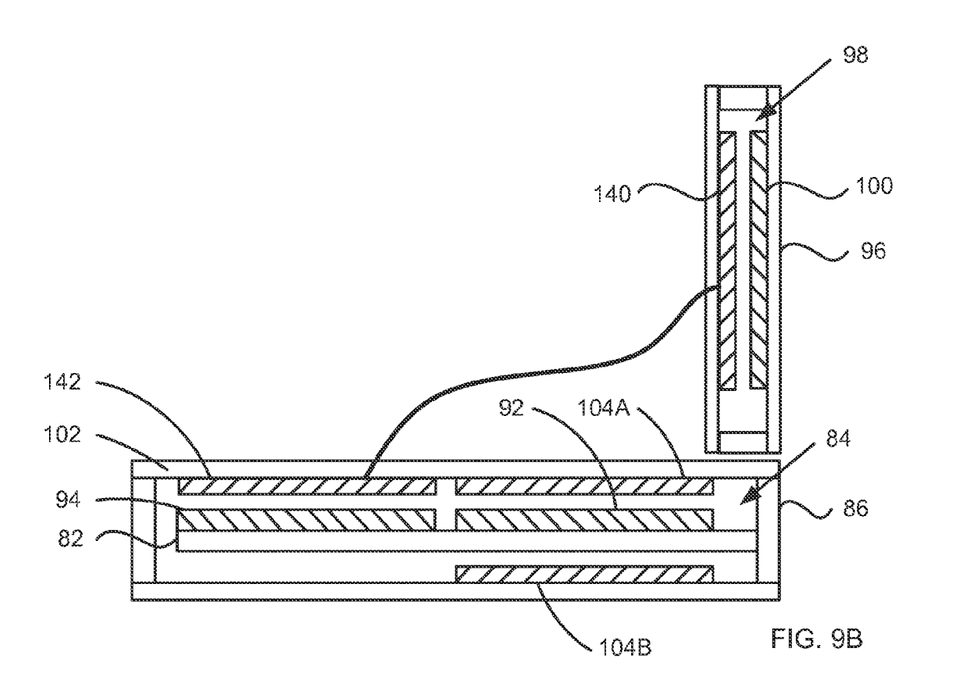

FIG. 9A shows a first alternative embodiment of an illustrative MEMS pressure sensor. As with the embodiment of FIGS. 4A-4B, a charged electrode 100 is mounted on flexible membrane 96 to move in response to a pressure stimulus. Rather than having the electrostatic force act directly on electrode 94 of the cantilever, an intermediate pair of electrodes 140, 142 are coupled together to provide a path for charge flow in response to motion of the flexible membrane. As the charged electrode 100 approaches electrode 140, it causes a charge transfer to electrode 142, which in turn exerts an electrostatic force on electrode 94 for detection via cantilever 82. This embodiment enables greater flexibility in the placement of flexible membrane 96 relative to the cantilever 82, even permitting one to be located some distance from the other and in a non-parallel orientation if desired. See, e.g., FIG. 9B, which shows the flexible membrane 96 oriented perpendicular to the cantilever 82. A wire couples the electrodes 140, 142 to enable a charge transfer in response to movement of the flexible membrane.

Figure 10:
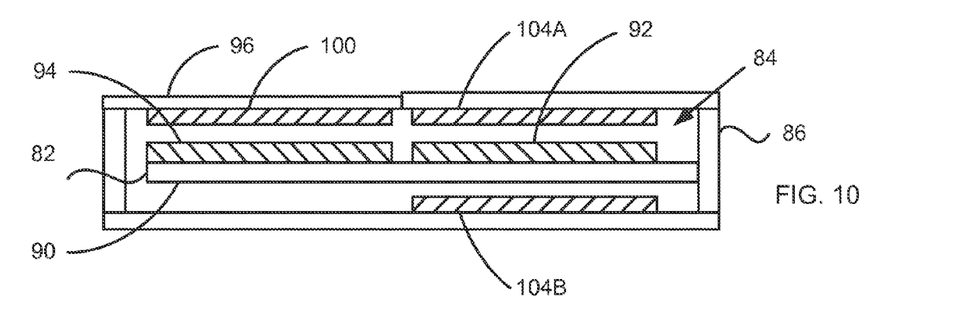
FIG. 10 shows an alternative embodiment of an illustrative MEMS pressure sensor with a partly flexible housing.

FIG. 10 shows a second alternative embodiment in which the flexible membrane 96 forms part of the wall of the first chamber 84, eliminating any need for a separate chamber 98 (FIG. 4). The repulsive charges on electrodes 94 and 100 enable motion of the flexible membrane to be translated into varying electrostatic force on the cantilever 82 as described previously.

Figure 11:
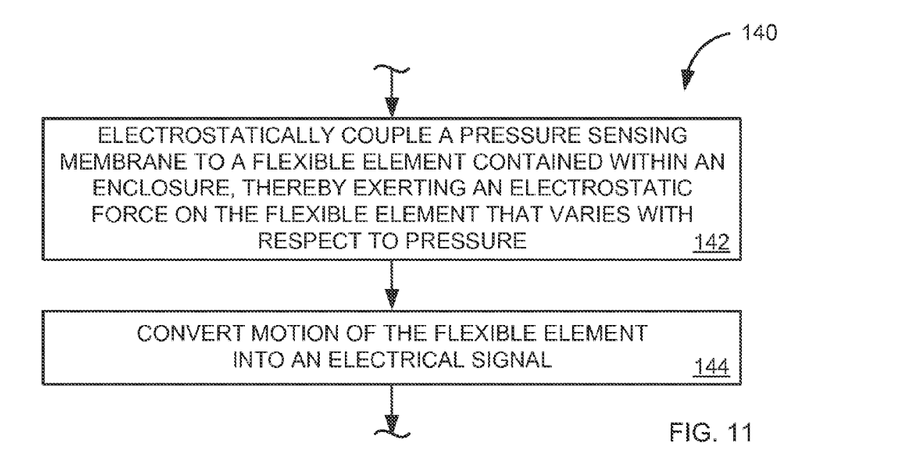
FIG. 11 is a flow diagram of an illustrative pressure sensing method.

FIG. 11 is a flowchart of one embodiment of the pressure sensing method 140 that is employed by at least some embodiments of the disclosed pressure sensors. During block 142, a pressure sensing membrane (e.g., the flexible membrane 96) is electrostatically coupled to a flexible element (e.g., the cantilever member 82) contained within a sealed enclosure (e.g., the housing 86). The pressure sensing membrane exerts an electrostatic force on the flexible element that varies with respect to pressure. In block 154, the motion or force acting on the flexible element is converted into an electrical signal. For example, the motion of the flexible element may be converted into an electrical signal by sensing a capacitance change caused by motion of the flexible element, and controlling the motion with a feedback signal. The electrical signal may include a pressure response component and an acceleration response component. The pressure response component may be enhanced by at least partially canceling the acceleration response component.

Numerous variations and modifications will become apparent to those skilled in the art once the above disclosure is fully appreciated. For example, the foregoing description employed marine seismic surveys as a context for describing digital pressure sensors and streamers, but the applications are not so limited. Moreover, other sensor feedback mechanisms may be employed beyond those described above. For example the control/sense electrodes can each be split into multiple electrodes for more precise sensing and individual feedback control. It is intended that the following claims be interpreted to embrace all such variations and modifications.

What is claimed is:

1. A sensor comprising:
a housing having at least one wall;
a cantilever element disposed within the housing, wherein a first end of the cantilever element is affixed to the at least one wall, and wherein a portion of the cantilever element is coupled to an output portion of the sensor; and
a membrane configured to exert an electrostatic force on the cantilever element to cause the cantilever element to move in response to pressure exerted on the membrane.

2. The sensor of claim 1, wherein the portion of the cantilever element is capacitively coupled to the output portion of the sensor.

3. The sensor of claim 1, wherein the output portion of the sensor is configured to output a signal indicative of a position of the cantilever element.

4. The sensor of claim 3, wherein the output portion further includes a signal-analyzing circuit.

5. The sensor of claim 1, wherein the membrane is configured to electrostatically couple to at least one intermediate electrode.

6. The sensor of claim 5, wherein the at least one intermediate electrode includes at least two electrically connected electrodes.

7. The sensor of claim 1, wherein the housing is sealed.

8. The sensor of claim 7, wherein the membrane forms a portion of a sealed enclosure disposed outside of the housing.

9. The sensor of claim 1, wherein the membrane is configured to exert the electrostatic force on a second, opposite end of the cantilever member.

10. A method, comprising:
towing a geophysical survey system that includes one or more sensors behind a vessel in a body of water, wherein at least one of the one or more sensors includes a cantilever member and a flexible membrane;
the flexible membrane receiving an external force;
in response to the received external force, the flexible membrane exerting an electrostatic force on the cantilever member;
the cantilever member departing from an equilibrium position; and
the at least one sensor outputting a signal indicative of a motion of the cantilever member.

11. The method of claim 10, further comprising an output portion of the at least one sensor outputting a second signal, wherein the second signal is usable to control the motion of the cantilever member.

12. The method of claim 11, wherein the controlling includes causing the cantilever member to return to the equilibrium position.

13. The method of claim 11, wherein the second signal includes a feedback signal.

14. The method of claim 10, further comprising analyzing the signal, wherein the analyzing includes determining a pressure component and an acceleration component of the signal.

15. An apparatus, comprising:
a seismic streamer cable having a first sensor that includes:
a sensing element and an output element;
wherein the sensing element includes a cantilever member and a membrane, wherein the membrane is configured, in response to a force exerted on the membrane, to cause a change in position of the cantilever member, wherein the change in position is indicative of an electrostatic force exerted by the membrane on the cantilever member; and
wherein the output element is configured to output a signal indicative of the force.

16. The apparatus of claim 15, wherein the sensing element is enclosed within a sealed housing.

17. The apparatus of claim 15, further comprising a second sensor, wherein the second sensor is connected to the first sensor such that the second sensor is configured to output a second signal corresponding to the first signal, wherein the second signal is indicative of a force exerted on the second sensor.

18. The apparatus of claim 17, wherein the second and the first signals have opposite polarities.

19. The apparatus of claim 17, wherein the output element is configured to output a signal that is at least partially based on the first and second signal, and wherein the signal includes an acceleration component and a pressure component.

20. The apparatus of claim 17, wherein the output element is configured to analyze the first signal at least partially based on the second signal.

* * * * *